US009037901B2

(12) United States Patent
Chauvet et al.

(10) Patent No.: US 9,037,901 B2
(45) Date of Patent: May 19, 2015

(54) DATA SET AUTORECOVERY

(75) Inventors: Philip R. Chauvet, Tucson, AZ (US);
David C. Reed, Tucson, AZ (US); Max D. Smith, Tucson, AZ (US); Keith R. Smith, Orlando, FL (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 13/213,544

(22) Filed: Aug. 19, 2011

(65) Prior Publication Data
US 2013/0047032 A1 Feb. 21, 2013

(51) Int. Cl.
*G06F 11/00* (2006.01)
*G06F 11/14* (2006.01)

(52) U.S. Cl.
CPC ............ *G06F 11/00* (2013.01); *G06F 11/1469* (2013.01)

(58) Field of Classification Search
CPC .............. G06F 11/0793; G06F 11/201; G06F 11/1402; G06F 11/1435; G06F 17/30312
USPC ....................................... 714/6.1, 15; 707/674
See application file for complete search history.

(56) References Cited

U.S. PATENT DOCUMENTS

| 4,903,194 | A | * | 2/1990 | Houdek et al. ................... 714/53 |
| 5,305,448 | A | * | 4/1994 | Insalaco et al. ................ 711/164 |
| 5,946,686 | A | * | 8/1999 | Schmuck et al. .............. 707/783 |
| 6,032,216 | A | * | 2/2000 | Schmuck et al. .............. 710/200 |
| 6,105,103 | A | * | 8/2000 | Courtright et al. ................. 711/1 |
| 6,631,477 | B1 | * | 10/2003 | LeCrone et al. ............. 714/5.11 |
| 7,475,199 | B1 | * | 1/2009 | Bobbitt et al. ................. 711/154 |
| 7,810,092 | B1 | * | 10/2010 | van Rietschote et al. ......... 718/1 |
| 8,261,024 | B1 | * | 9/2012 | Shavit et al. ................... 711/147 |
| 8,458,519 | B2 | * | 6/2013 | McCune et al. ................. 714/25 |
| 8,892,941 | B2 | * | 11/2014 | Dudgeon et al. ............. 714/6.32 |
| 2002/0023070 | A1 | * | 2/2002 | Branch et al. ..................... 707/1 |
| 2002/0095616 | A1 | * | 7/2002 | Busser ............................... 714/8 |
| 2005/0187990 | A1 | * | 8/2005 | Pace et al. ...................... 707/204 |
| 2008/0008202 | A1 | * | 1/2008 | Terrell et al. .................. 370/401 |
| 2010/0017800 | A1 | * | 1/2010 | Dow et al. .......................... 718/1 |
| 2010/0049937 | A1 | * | 2/2010 | Chauvet et al. ............... 711/170 |
| 2010/0077255 | A1 | * | 3/2010 | Lehr et al. ........................ 714/16 |
| 2010/0094811 | A1 | * | 4/2010 | Lehr et al. ...................... 707/674 |
| 2010/0174752 | A1 | * | 7/2010 | Kimmel et al. ............... 707/791 |
| 2010/0185589 | A1 | * | 7/2010 | Clarke et al. .................. 707/674 |
| 2010/0280998 | A1 | * | 11/2010 | Goebel et al. ................. 707/652 |
| 2011/0258389 | A1 | * | 10/2011 | Li et al. ......................... 711/114 |
| 2011/0302447 | A1 | * | 12/2011 | Watanabe et al. ............ 714/6.22 |
| 2012/0005528 | A1 | * | 1/2012 | Belisle et al. ................... 714/15 |
| 2012/0110288 | A1 | * | 5/2012 | Lehr et al. ..................... 711/162 |
| 2012/0179874 | A1 | * | 7/2012 | Chang et al. .................. 711/128 |
| 2012/0324183 | A1 | * | 12/2012 | Chiruvolu et al. ............ 711/162 |
| 2013/0024722 | A1 | * | 1/2013 | Kotagiri et al. ................ 714/6.1 |
| 2013/0036279 | A1 | * | 2/2013 | Tatara ........................... 711/162 |

\* cited by examiner

*Primary Examiner* — Loan L. T. Truong
(74) *Attorney, Agent, or Firm* — Kunzler Law Group

(57) ABSTRACT

An approach to providing auto recovery of data sets in volumes. When an error condition results from an attempt to access an unintentionally deleted data set, an event is generated and sent to other systems with access to the volume in which the data set existed. The volume is also locked to prevent corruption during the recovery process. A system that has the unintentionally deleted data set open retrieves location information for the data set from control blocks in the system's memory. This location information is used to build a new entry for the data set in the VTOC for the volume. When the data set is thus recovered, the data set is validated, the lock removed, and the data set is made available to the systems sharing the volume.

17 Claims, 6 Drawing Sheets

DATA SET AUTORECOVERY

BACKGROUND

1. Field

The subject matter disclosed herein relates to recovering unintentionally deleted data sets in a virtual storage access method (VSAM) system.

2. Description of the Related Art

Accidental deletion of data is going to happen in a data storage system, often because of human error. For example, an administrator managing a virtual storage access method (VSAM) system may unintentionally delete a data set in a volume. Once the administrator realizes her error, she has to rebuild the unintentionally deleted data set from backup sources. Depending on the size of the data set, this can be a time consuming task. And if the data set was not backed up properly, the data set may be irretrievably lost.

Accidental deletion is particularly painful if the data set is a VSAM volume data set (VVDS). A VVDS is a data set that describes the dynamic characteristics of VSAM and system-managed data sets residing on a given volume. The VVDS is part of the integrated catalog facility (ICF) and contains information about data sets on the volume. The VVDS is commonly used to provide attribute information so that, when opening or accessing a data set on the volume, the attributes of the data set are known. If the VVDS is accidentally deleted, the administrator typically has to rebuild the entire volume, not just one data set, in order to reconstruct the VVDS. The administrator will have to define a new VVDS and then recover all of the data sets that existed on the volume from backup data sources such as tape drives. This process of determining that the problem is a deleted VVDS, configuring the backup data sources, preparing the volume to be rebuilt, and transferring all of the data on the backup data sources to the volume, and then validating the restore operation is time-consuming. The resulting costs to an entity using the volume, in terms of time, money, and loss of data availability, can be very high. Furthermore, if the data sets were inadequately backed up, data may be lost.

BRIEF SUMMARY

An approach to auto-recovery of data sets is disclosed. The summary that follows is for convenience, and is not a limitation on the claims. In one embodiment, the invention is realized as a computer program product for auto-recovery of data sets. The computer program product may comprise instructions for receiving, on a first system, an error condition indicating that a virtual storage access method (VSAM) volume data set (VVDS) on a volume is not found. The volume may be shared by the first system and one or more second systems. The systems may be organized as a sysplex.

The instructions may further cause sending an event to one or more of the second systems in response to receiving the error condition. The event requests VVDS location information from a second system that has the VVDS open. The VVDS location information may be extent information in control blocks created in the memory of the second system. The VVDS may then be recovered using the VVDS location information retrieved by the second system that has the VVDS open.

There may be further be instructions for locking the volume when the error condition is received, and maintaining the lock until the VVDS is recovered, or it is determined that the VVDS cannot be recovered. There may also be instructions for validating the VVDS following recovery.

Recovering the VVDS may involve rebuilding an entry in the volume table of contents (VTOC) for the VVDS from the VVDS location information. The first system that generates the request may receive the VVDS location information and recover the VVDS. In other embodiments, the system that has the VVDS location information in memory recovers the VVDS.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
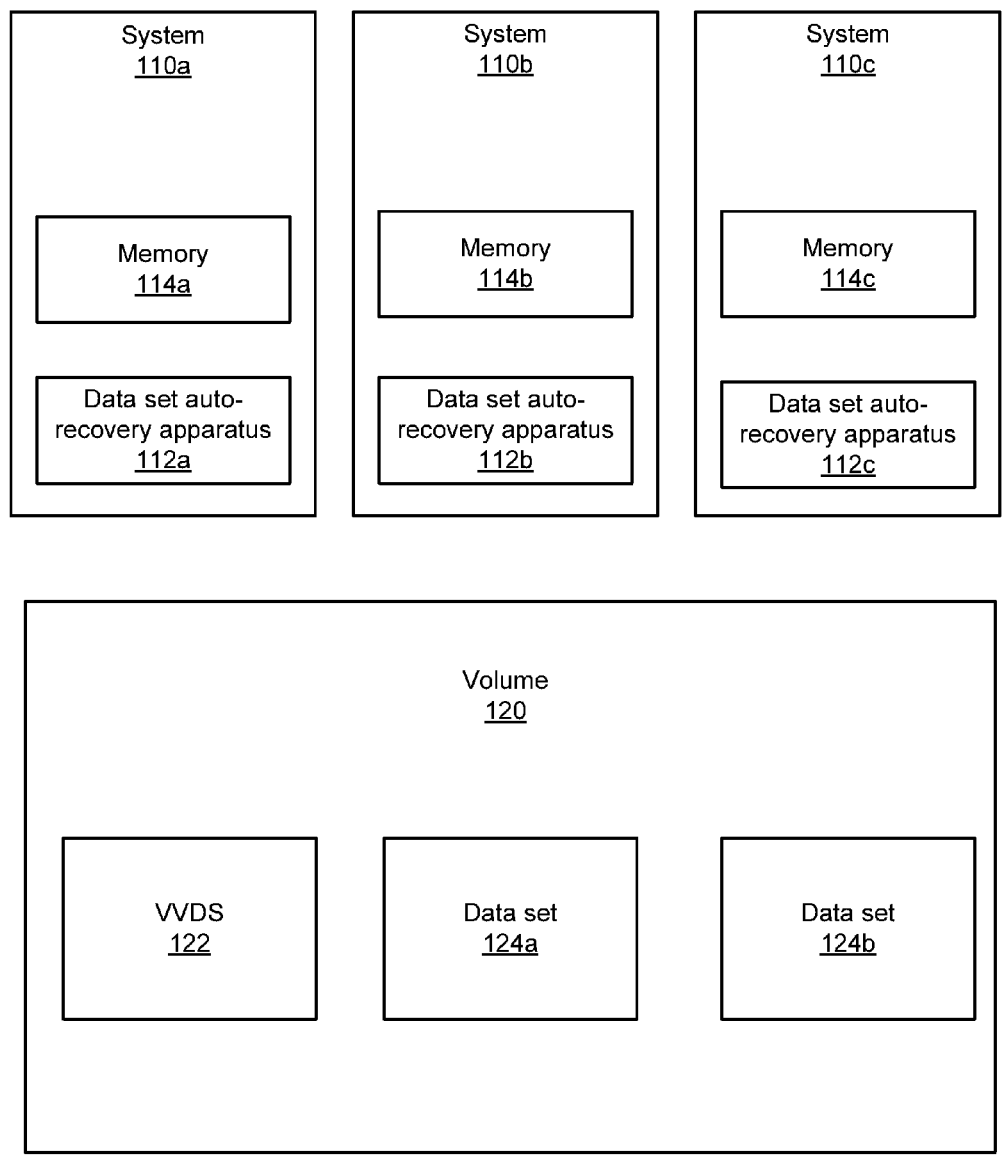
FIG. 1 is an illustrative block diagram showing one embodiment of systems comprising data set auto-recovery apparatuses sharing a volume.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of systems 110a-c providing auto-recovery of deleted data sets. In the depicted embodiment, there are three systems 110a-c, each comprising memory 114a-c and a data set auto-recovery apparatus 112a-c. The systems 110a-c are in communication with a volume 120. As used herein, a system 110 refers to a logical entity that represents at least one processor and storage and some element of work, and that is logically separate from other systems 110. The systems 110a-c, while logically separate, may be organized in a systems complex, commonly called a Sysplex. The systems 110 that are members of the Sysplex may share information with other systems 110 in the Sysplex.

Each system 110 has access to memory 114 for storing information used by the system 110 in performing operations. For example, when system 110b opens VVDS 122 on the volume 120, a set of control blocks are built in memory 114b that describe the extends of the VVDS 122. These control blocks may be deleted from memory 114b when the system 110b closes the VVDS 122. The memory 114 may be volatile memory, such as DRAM, or other varieties of volatile memory.

The volume 120 is a logical construct representing a unit of storage. The volume 120 may be organized as cylinders and tracks grouped as a volume. The volume 120 typically has a number of physical storage devices (such as hard disk drives, tape drives, solid state storage drives, or other storage devices) supporting the logical construct. In the depicted embodiment, the volume 120 includes a VVDS 122, and data sets 124a-b.

A VVDS 122 is a data set that describes the dynamic characteristics of VSAM and system-managed data sets residing on the volume 120. The VVDS 120 is part of the integrated catalog facility (ICF) and contains information about data sets 124a-b on the volume 120. The VVDS 120 is commonly used to provide attribute information so that, when opening or accessing a data set 124a-b on the volume 120, the attributes of the data set 124a-b are known. If the VVDS 122 is accidentally deleted, the administrator typically has to rebuild the VVDS 122 by rebuilding the entire volume 120. The administrator will have to define a new VVDS 122 and then recover all of the data sets 124a-b that existed on the volume 120.

The volume 120 contains one or more data sets 124. In the depicted embodiment, the volume 120 includes two data sets: data set 124a, and data set 124b. However, the number of data sets 124 in a volume 120 may vary. As used herein, the term data set 124 refers to a mainframe computer file having a record organization that is accessible using VSAM access methods. The term data set 124 encompasses a VVDS 120 and other varieties of data sets 124.

FIG. 1 also shows the systems 110a-c having data set auto-recovery apparatus 112a-c. In one embodiment, each system 110a-c has a data set auto-recovery apparatus 112a-c. In other embodiments, only some systems 110a-c have a data set auto-recovery apparatus 112a-c. The data set auto-recovery apparatus 112 automatically recovers a deleted data set (whether a data set 124 of a VVDS 122) using location information stored in memory 114 by one of the systems 110.

For example, a user of system 110a may accidentally delete the VVDS 122, causing the deletion of information about the VVDS 122 in the volume table of contents (VTOC) for the volume 120. If the system 110a attempts to access the VVDS 122 after it has been deleted, an error condition indicating that the VVDS 122 on the volume 120 is generated. The data set auto-recover apparatus 112a may receive the error condition and send a request to the systems 110b and 110c to determine whether the VVDS 122 is open on system 110b or system 110c. The request may be any sort of communication that specifies what information is sought, and may take various forms. In one embodiment, the request is an event. If the VVDS 122 is open on system 110c, the data set auto-recovery apparatus 112b may retrieve location information for the VVDS 122 out of memory 114b, and send the location information to the data set auto-recovery apparatus 112a. The data set auto-recovery apparatus 112a may reconstruct an entry in the VTOC for the VVDS 122 using the location information. In another embodiment, the data set auto-recovery apparatus 112b may reconstruct an entry in the VTOC for the VVDS 122.

Figure 2:
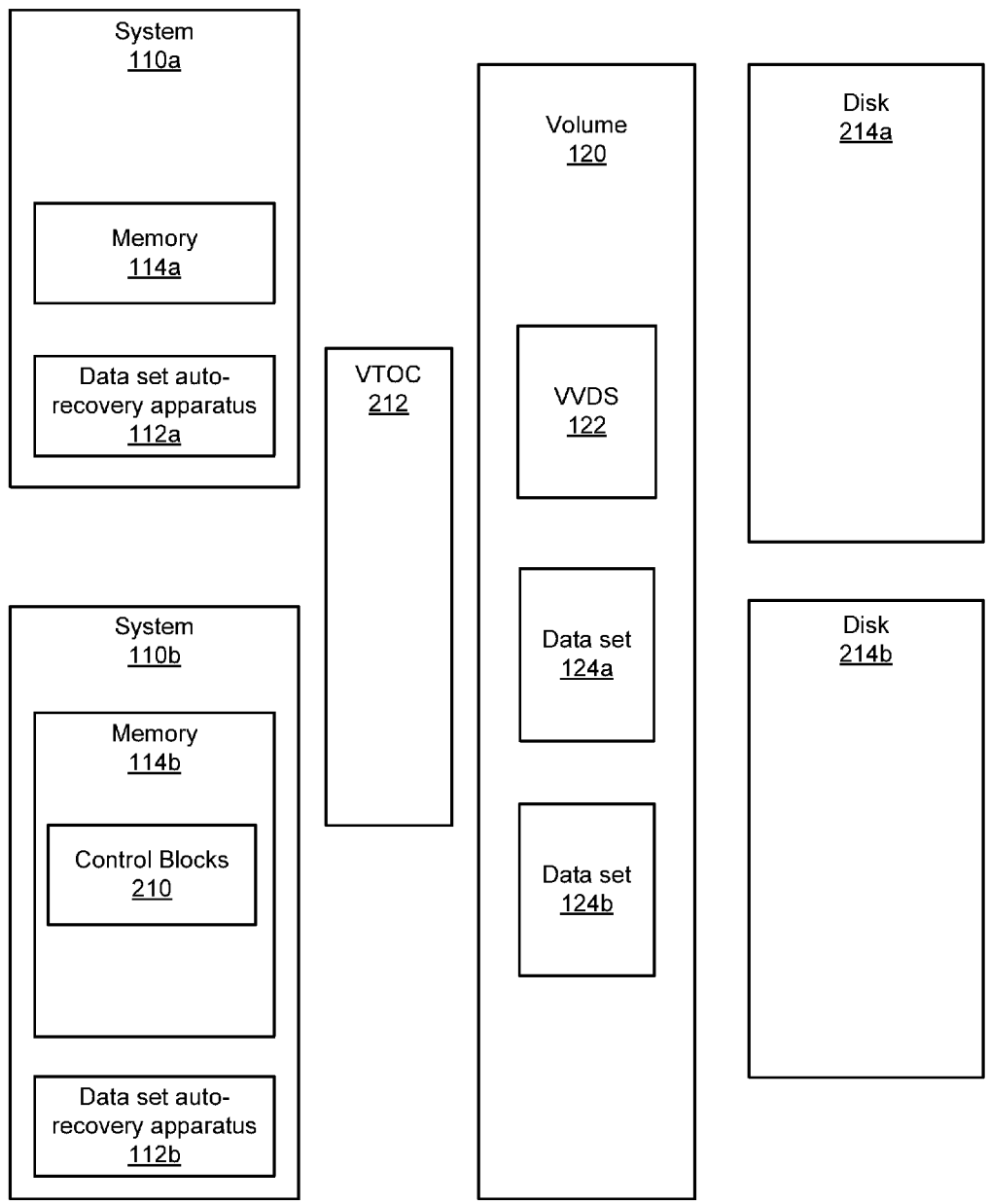
FIG. 2 is an illustrative block diagram showing one embodiment of systems comprising data set auto-recovery apparatuses sharing a volume, and also illustrating a VTOC and disks providing the physical storage for the volume.

FIG. 2 shows a second embodiment of systems 110a-b providing auto-recovery functionality for deleted data sets. FIG. 2 shows systems 110a and 110b, VTOC 212, volume 120, and disks 214a-b. The term VTOC 212, as used in this application, refers to a data structure that provides a way of locating data sets 124 that reside on a volume 120 associated with the VTOC 212. The VTOC 212 describes the location of the data sets 124 (including the VVDS 122) on the volume 120 and the location of freespace on the volume 120.

FIG. 2 also shows disks 214a and 214b. The term disk 214 is used broadly to indicate any appropriate computer readable storage medium that can be used to provide storage supporting a volume 120. The disks 214a-b may be hard disk drives, tape drives, solid state storage, or other suitable storage media. The disks 214a-b provide the physical storage for the logical unit of storage represented by the volume 120.

Continuing the example above, an administrator may accidentally delete the VVDS 122 in the volume 120. When an application attempts to access the VVDS 122 after the deletion, an error condition is generated indicating that the VVDS 122 for the volume 120 is not found. The data set auto-recovery apparatus 112a may receive this error condition.

The data set auto-recovery apparatus 112a may send an event to the systems sharing access to the volume 120 in response to receiving the error condition. The event may be broadcast to all members of the sysplex, where the systems 110 sharing access to the volume 120 are members of a sysplex. The event may request VVDS 122 location information from any system 110 that has the VVDS 122 open. In one embodiment, the event requests that the data set auto-recovery apparatus 112b, operating on the system 110b that has the VVDS 122 open, send a response containing the VVDS 122 location information to the data set auto-recovery apparatus 112a. The data set auto-recovery apparatus 112a may recover the VVDS 122 using the VVDS 122 location information recovered by the system 110b.

In another embodiment, the event requests the VVDS 122 location information from the data set auto-recovery apparatus 112b, and the data set auto-recovery apparatus 112b recovers the VVDS 122 using the VVDS 122 location information. In such an embodiment, the data set auto-recovery apparatus 112b may send the data set auto-recovery apparatus 112a a response notifying the data set auto-recovery apparatus 112a that the VVDS 122 has been successfully recovered.

VVDS 122 location information is metadata that specifies the location of the VVDS 122 in the volume 120. When a system 110 (such as system 110b in FIG. 2) opens the VVDS 122, a set of control blocks 210 are built in memory 114b. The control blocks 210 include extent information that describes the extents of the VVDS 122 in the volume 120. The control blocks 210 typically remain in memory until the system 110b closes the VVDS 122. The VVDS 122 location information may be extent information that shows the beginning cylinder and track for the VVDS 122, and the ending cylinder and track for the VVDS 122. In such embodiments, the data set auto-recovery apparatus 112b may retrieve the VVDS 122 location information from the control blocks 210 in memory 114b on the system 110b.

Figure 3:
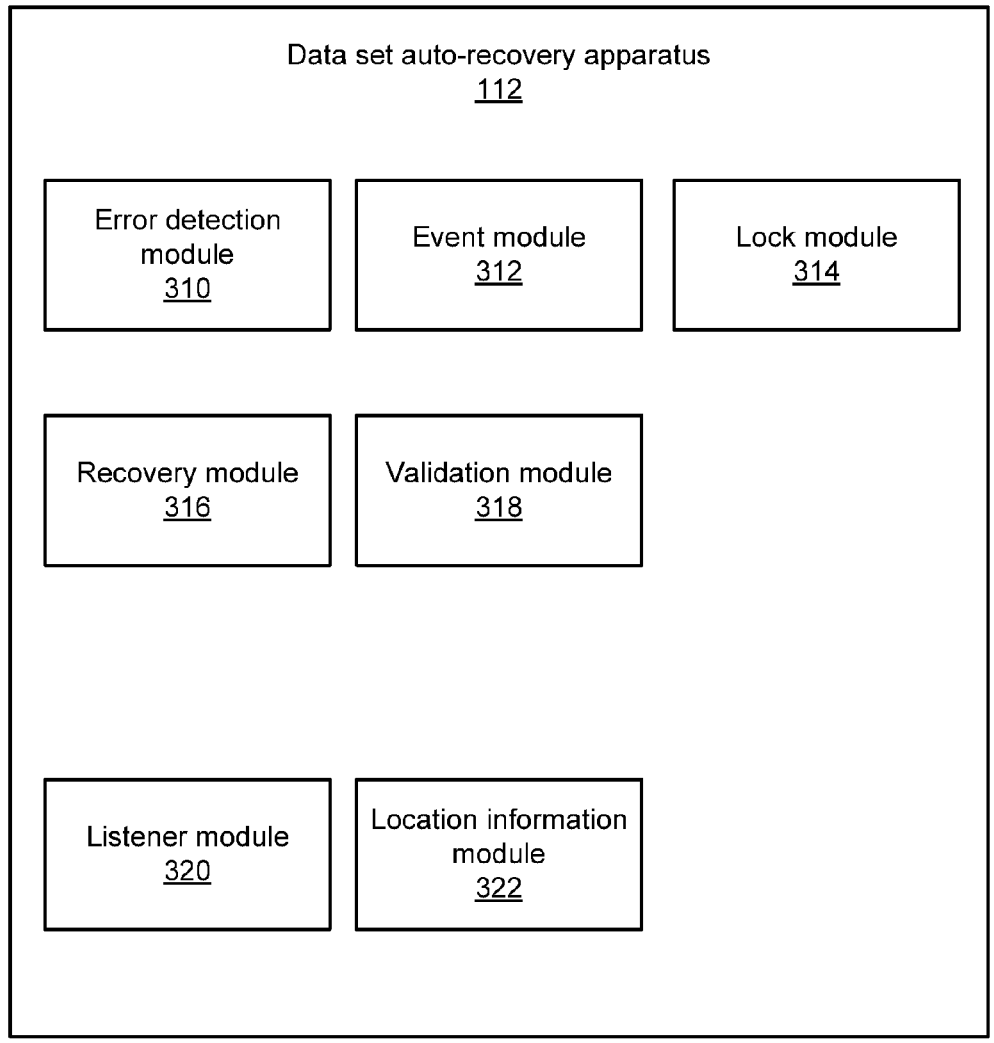
FIG. 3 is an illustrative block diagram showing one embodiment of a data set auto-recovery apparatus.

FIG. 3 shows one embodiment of a data set auto-recovery apparatus 112. In the depicted embodiment, the data set auto-recovery apparatus 112 includes an error detection module 310, an event module 312, a lock module 314, a recovery module 316, a validation module 318, a listener module 320, and a location information module 322.

The error detection module 310 may be configured to receive error conditions indicating that a data set 124 is not found on the system 110 of which the data set auto-recovery apparatus 112 is a part. The error condition may be generated when the system 110 attempts to access the data set 124. The data set 124 may be a VVDS 122. The phrase "receiving error conditions" is used broadly to encompass various approaches to receiving an error condition, including, but not limited to, intercepting an error condition, detecting an error condition, and other approaches.

The event module 312 may be configured to send an event to one or more systems 110 that are separate from the system 110 that generated the error condition. The event module 312 may send the event in response to the error detection module 310 receiving the error condition. The event requests location information for the data set 124 that is not found from at least one of these separate systems 110 that has the data set 124 open.

The data set auto-recovery apparatus 112 may further comprise a lock module 314. The lock module 314 may be configured to lock the volume 120 such that the data in the volume 120 cannot be changed until the lock is released. The lock may be a hardware reserve that is raised on the volume 120. The lock module 314 may lock the volume 120 immediately after the error condition is received by the error detection module 310. The lock module 314 may lock the volume 120 at different times in different embodiments.

Locking the volume 120 helps increase the odds that the data set 124 can be recovered. When the data set 124 is deleted, the VTOC 212 is altered to reflect that the space on the disks 214a-b used by the data set 124 is now free space. However, the data is not necessarily deleted immediately from the disk 214a-b. Typically, the data that was in the data set 124 is permanently lost only when the areas on the disk 214a-b that stored that data are overwritten. Placing a lock on the volume 120 may decrease the chance that the data for the data set 124 is overwritten and lost before recovery is complete.

The recovery module 316 recovers the data set 124 using the location information recovered by the system 110 that had the data set 124 open. In certain embodiments, recovering the data set 124 may involve rebuilding an entry in the VTOC 212 for the data set 124 from the location information. As explained above, the VTOC 212 maps tracks on the volume 120. The VTOC 212 contains format 1 and format 3 data set control blocks (DSCBs) that provide information concerning what track ranges belong to particular data sets 124. When a data set 124 is deleted, the format 1 and format 3 DSCBs for that data set 124 are removed from the VTOC 212. Format 5 DSCBs, which are used to identify free space in the volume 212, are then inserted for the ranges of the now deleted data set 124.

The location information may be extent information taken from control blocks in memory 114 of the system 110 that had the data set 114 open. The extent information may show the beginning cylinder and track location of the data set 114, and the ending cylinder and track for the data set 114. The recovery module 316 may use this extent information to create format 1 and format 3 DSCBs for the data set 114 and insert them into the VTOC 212. The recovery module 316 may also remove the relevant format 5 DSCBs from the VTOC 212 as part of recovering the data set 114.

The data set auto-recovery apparatus 112 may also include a validation module 318. After the recovery module 316 has recovered the data set 114, the validation module 318 may check the recovered data set 114 for inconsistencies. For example, where the recovered data set 114 was the VVDS 122, the validation module 318 may read through the VVDS 122 and compare the information within it with information in the ICF in order to make sure the VVDS 122 is correct. The validation module 318 may fail the recovery of the VVDS 122 if it finds inconsistencies. Failing the recovery of the VVDS 122 may involve removing the entries in the VTOC 212 created by the recovery module 316, and notifying the administrator that the VVDS 122 must be manually recovered from backup data.

The data set auto-recovery apparatus 112 may also include a listener module 320. The listener module 320 may listen for events generated by other systems 110 that have received an error condition indicating that a data set 114 is not found. The listener module 320 may be an event notification facility (ENF) listener.

The event may identify the data set 114 that was not found on the system 110 that generated the event. The location information module 322 may be configured to determine whether or not the system 110 on which the data set auto-recovery apparatus 112 operates has the identified data set 114 open. If the system 110 does not have the identified data set 114 open, the location information module 322 may generate a response indicating that the data set 114 is not open, and send that response to the system 110 that generated the event. In other embodiments, no response is sent if the system 110 does not have the identified data set 114 open.

If the system 110 on which the data set auto-recovery apparatus 112 operates has the identified data set 114 open, the location information module 322 may retrieve location information for the identified data set 114 out of memory 114. The location information module 322 may then sent the retrieved location information to the data set auto-recovery apparatus 112 operating on the system 110 that generated the event. In other embodiments, the location information module 322 sends the location information to the recovery module 316 on the same system 110, and the recover module 316 recovers the data set 114.

Figure 4:
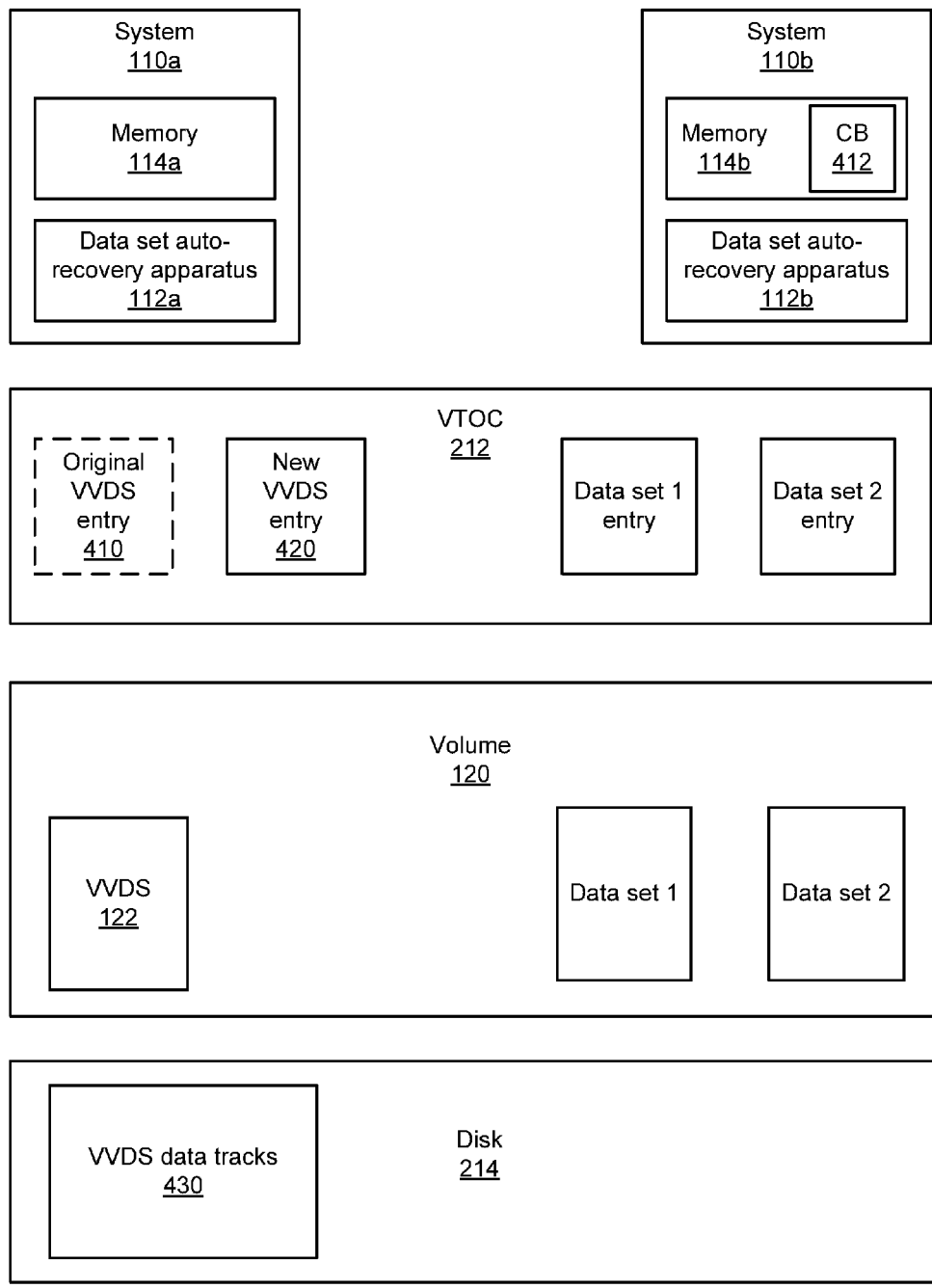
FIG. 4 is an illustrative block diagram showing an example of auto-recovery of a VVDS.

FIG. 4 depicts an example of how two data set auto-recovery apparatus 112a and 112b can automatically recover a data set 114. The following description is one example of how auto recovery may take place, and is not intended to limit broader application of the invention.

In FIG. 4, system 110a and system 110b both have access to the volume 120. In the depicted embodiment, the system 110b has the VVDS 122 open. Because the system 110b has the VVDS 122 open, control blocks 412 containing VVDS 122 location information are in memory 114b. In this example, a user of system 110a accidentally deletes VVDS 122. As a result, the original VVDS entry 410 in the VTOC 212 is deleted (as represented by dotted lines). The VVDS data tracks 430, which hold the VVDS data, are then listed as free space in the VTOC 212. As a result, when the system 110a attempts to access the VVDS 122 at a later time, an error condition indicating the VVDS 122 is not found results since there is no entry for the VVDS 122 in the VTOC 212.

In response to the error condition, the data set auto-recovery apparatus 112a locks the volume 120 to prevent further changes, and sends an event to the system 110b requesting VVDS 122 location information. Because the system 110b has the VVDS 122 open, the control blocks 412 in memory 114b contain VVDS 122 location information that provides extent information showing the range of the VVDS 122. The data set auto-recovery apparatus 112b retrieves the VVDS 122 location information out of memory 114b. In one embodiment, the data set auto-recovery apparatus 112b sends the VVDS 122 location information to the data set auto-recovery apparatus 112a, which then recovers the VVDS 122. In other embodiments, the data set auto-recovery apparatus 112b itself recovers the VVDS 122. In this example, the data set auto-recovery apparatus 112a recovers the VVDS 122.

The data set auto-recovery apparatus 112a uses the VVDS 122 location information to build the new VVDS entry 420 in the VTOC 212. The data set auto-recovery apparatus 112a may first check the VTOC 212 to ensure that the extent range for the VVDS 122 is still available. If the extent range is not available, the data set auto-recovery apparatus 112a may notify the administrator that recovery from a backup source is necessary. If the extent range is still available, then the new VVDS entry 420 is created.

After the new VVDS entry 420 is created, the data set auto-recovery apparatus 112a may prevent systems 110 from accessing the VVDS 122 until the VVDS 122 is validated. For example, a system 110 may have defined, and then deleted, a data set 114 that occupied VVDS data tracks 430 before the error condition was generated. Thus, the extent range for the VVDS 122 would still show up as available, but the underlying data in the VVDS data tracks 430 would have been corrupted. The data set auto-recovery apparatus 112a may use diagnostic utilities to determine whether the VVDS 122 is valid. If the VVDS 122 is determined to be valid, the data set auto-recovery apparatus 112a may then release the lock and allow all systems 110 to use the VDS 122 as thought it had not been deleted without resorting to a painful backup process.

Figure 5:
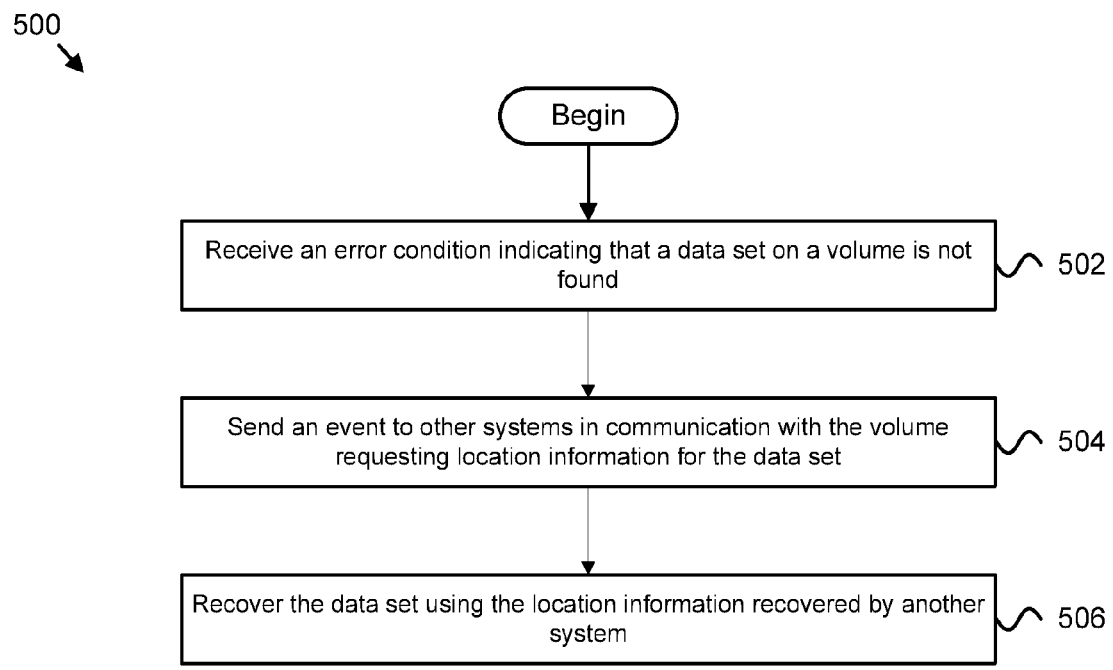
FIG. 5 is a flow chart diagram showing one embodiment of a method for recovering data sets.

FIG. 5 shows one embodiment of a method 500 for performing auto-recovery of a data set 114 on a volume 120. The method involves receiving 502 an error condition indicating that a data set 114 for the volume 120 shared by multiple systems 110 is not found. The method 500 may further involve sending 504 an event to the other systems 110 in communication with the volume 120 in response to receiving the error condition. The event may request location information for the data set 114 for which the error condition was generated. The method 500 may also involve recovering 506 the data set 114 using the location information recovered by another system 110.

Figure 6:
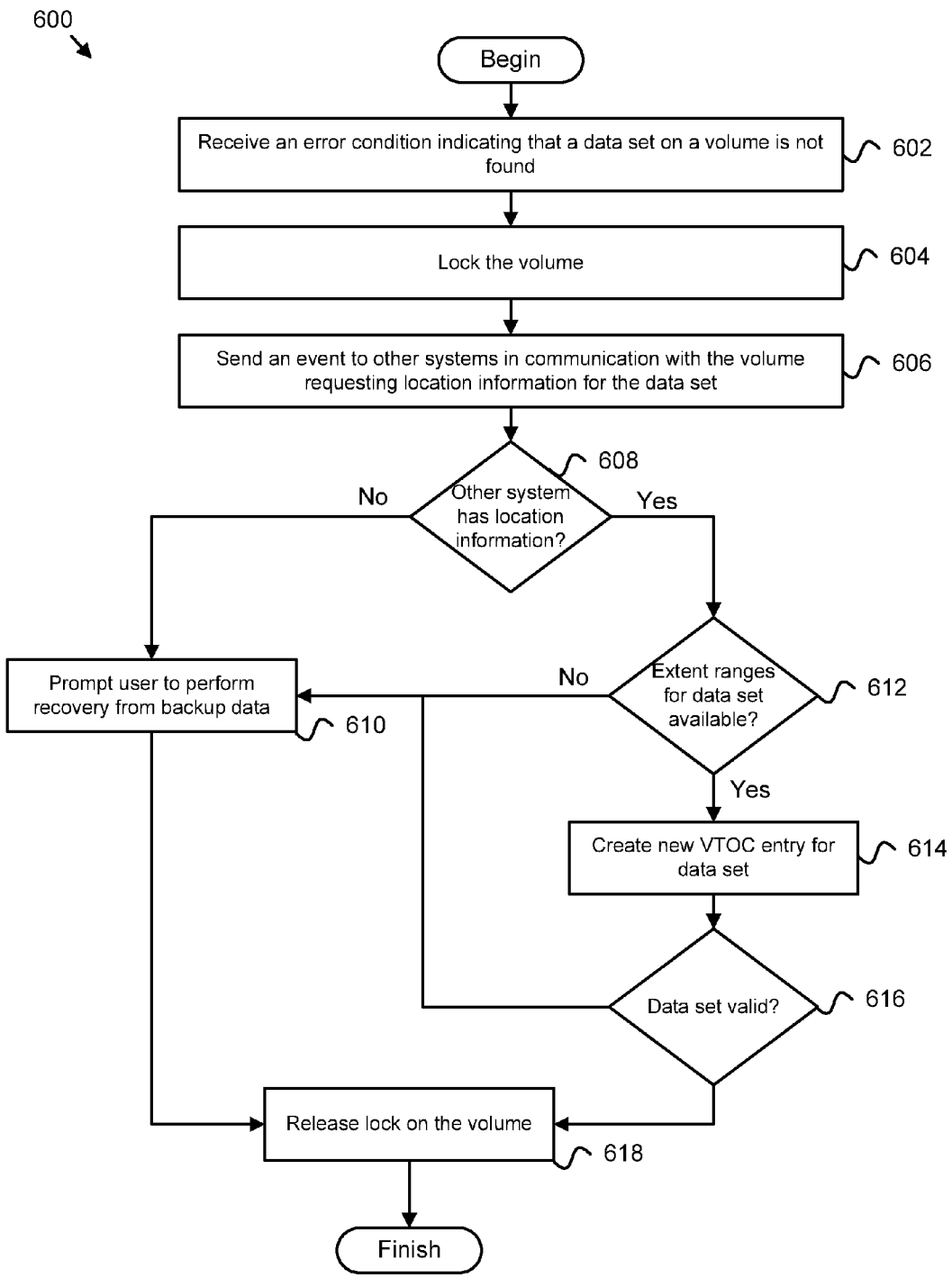
FIG. 6 is a flow chart diagram showing a second embodiment of a method for recovering data sets.

FIG. 6 shows another embodiment of a method 600 for performing auto-recovery of a data set 114 on a volume 120. The method 600 begins with receiving 602 an error condition indicating that a data set 114 on the volume 120 is not found. The method 600 also involves locking 604 the volume 120, preventing any updating that may corrupt the data set 114 during the recovery process. The method 600 may further involve sending 606 an event to other systems 110 in communication with the volume 120 requesting location information for the data set 114 for which the error condition was generated.

The method 600 may further involve determining 608 whether another system 110 has location information. If not, the user may be notified that auto-recovery is not possible, and prompted 610 to perform recover from backup data. If another system 110 has location information, the method 600 may involve determining 612 whether the extent ranges for the data set 114 are available. This may involve, for example, determining whether the VTOC 212 shows a track associated with the extent range as being in use. If the extent ranges for the data set 114 are not available, the method 600 may involve prompting 610 the user to perform recovery from backup data.

If the extent ranges are available, the method 600 may involve creating 614 a new entry in the VTOC 212 for the data set 114. The method 600 may involve determining 616 if the data set 114 is valid. If the data set 114 is not valid, the user is notified that auto-recovery is not possible, and prompted to perform recovery from backup data. If the data set 114 is valid, the method 600 may involve releasing 618 the lock on the volume 120, thus presenting a volume 120 with a recovered data set 114 for use by all systems 110 in communication with the volume 120.

In certain embodiments, the auto-recovery capability discussed herein is turned on by default in each system 110. An administrator may be provided with the option of turning the auto-recovery capability off. Similarly, a unique delete command may be provided to allow an administrator to indicate that the deletion is being done intentionally, and that a deleted data set 114 should not be auto-recovered. For example, a keyword NORECOV included after a delete command may cause deletion of the specified data set 114 and prevent auto-recovery functionality from recovering the deleted data set 114.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer-readable storage medium comprising instructions for:
    receiving, on a first system, an error condition indicating that a virtual storage access method (VSAM) volume data set (VVDS) on a volume shared by the first system and one or more second systems is not found;
    locking the volume from receiving changes in response to the error condition;
    sending a request to one or more of the second systems in response to receiving the error condition, the request requesting VVDS location information from a second system that has the VVDS open in a memory of the second system, the VVDS location information comprising control blocks, the control blocks storing extent information for the VVDS, wherein only systems with the VVDS open comprise the control blocks; and
    recovering the VVDS using the VVDS location information retrieved by the second system that has the VVDS open by copying the extent information from the control blocks in the memory of the second system to a new VVDS entry in a volume table of content (VTOC).

2. The computer program product of claim 1, further comprising:
    maintaining the lock until one of:
    recovering the new VVDS; and
    determining that the VVDS cannot be recovered.

3. The computer program product of claim 1, further comprising validating the new VVDS following recovery of the new VVDS.

4. The computer program product of claim 1, wherein the VVDS location information is extent information that shows a beginning cylinder and track for the VVDS and an ending cylinder and track for the VVDS.

5. The computer program product of claim 1, wherein recovering the VVDS further comprises rebuilding an entry in the volume table of contents (VTOC) for the new VVDS from the VVDS location information.

6. The computer program product of claim 1, further comprising the first system receiving a response comprising VVDS location information from the second system that has the VVDS open, and wherein the first system recovers the VVDS using the VVDS location information.

7. The computer program product of claim 1, wherein the second system that has the VVDS open recovers the VVDS using the VVDS location information, further comprising the second system sending a response notifying the first system that the VVDS is recovered.

8. The computer program product of claim 2, wherein the first system and the one or more second systems are organized as a sysplex.

9. A system comprising:
    a virtual storage access method (VSAM) volume having one or more VSAM volume data sets (VVDS);
    a first system having access to the volume;
    one or more second systems having access to the volume; and
    a data set auto-recovery apparatus configured to:
        receive an error condition from the first system indicating that a VVDS on the volume is not found;
        lock the volume from receiving changes in response to the error condition;
        send an request to the one or more second systems in response to receiving the error condition, the request requesting location information from a second system that has the VVDS open in a memory of the second system, the VVDS location information comprising control blocks, the control blocks storing extent information for the VVDS, wherein only systems with the VVDS open comprise the control blocks; and
        recover the VVDS using the location information retrieved by the second system that has the VVDS open by copying the extent information from the control blocks in the memory of the second system to a new VVDS entry in a volume table of content (VTOC).

10. The system of claim 9, wherein the one or more second systems each comprise a listener for receiving the request.

11. The system of claim 9, wherein recovering the VVDS comprises rebuilding an entry in the volume table of contents (VTOC) for the VVDS from the location information.

12. The system of claim 9, wherein the second system that has the VVDS open sends the location information to the first system, and the first system recovers the VVDS.

13. The system of claim 9, wherein the second system that has the VVDS open recovers the VVDS.

14. A method comprising:
    receiving, on a first system, an error condition indicating that a virtual storage access method (VSAM) volume data set VVDS on a VSAM volume shared by the first system and one or more second systems is not found;
    locking the volume from receiving changes in response to the error condition;
    sending an request to one or more of the second systems in response to receiving the error condition, the request requesting location information for the VVDS from a second system that has the VVDS open in a memory of the second system, the VVDS location information comprising control blocks, the control blocks storing extent information for the VVDS, wherein only systems with the VVDS open comprise the control blocks; and recovering the VVDS using the location information retrieved by the second system that has the data set open by copying the extent information from the control blocks in the memory of the second system to a new VVDS entry in a volume table of content (VTOC).

15. The method of claim 14, further comprising maintaining the lock until one of:

recovering the new VVDS; and determining that the VVDS cannot be recovered.

16. The method of claim 14, further comprising validating contents of the new VVDS following recovery of the new VVDS.

17. The method of claim 14, wherein recovering the VVDS further comprises rebuilding an entry in the volume table of contents (VTOC) for the new VVDS from the location information.

* * * * *